United States Patent
Sutton et al.

(10) Patent No.: US 9,517,454 B2
(45) Date of Patent: Dec. 13, 2016

(54) DIESEL PARTICULATE FILTER

(71) Applicants: Neal Sutton, Baldock (GB); Martyn Vincent Twigg, Cambridge (GB)

(72) Inventors: Neal Sutton, Baldock (GB); Martyn Vincent Twigg, Cambridge (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/161,384

(22) Filed: May 23, 2016

(65) Prior Publication Data

US 2016/0310935 A1    Oct. 27, 2016

Related U.S. Application Data

(62) Division of application No. 13/701,306, filed as application No. PCT/IB2011/001205 on Jun. 2, 2011, now Pat. No. 9,352,277.

(60) Provisional application No. 61/350,889, filed on Jun. 2, 2010.

(51) Int. Cl.
| | |
|---|---|
| *B01D 1/12* | (2006.01) |
| *B01J 29/44* | (2006.01) |
| *B01D 53/94* | (2006.01) |
| *B01J 23/44* | (2006.01) |
| *B01J 29/80* | (2006.01) |
| *B01J 35/00* | (2006.01) |
| *B01J 35/02* | (2006.01) |
| *B01J 35/04* | (2006.01) |
| *B01J 37/00* | (2006.01) |
| *B01J 37/03* | (2006.01) |
| *F01N 3/022* | (2006.01) |
| *F01N 3/035* | (2006.01) |
| *B01J 29/76* | (2006.01) |

(52) U.S. Cl.
CPC ............ *B01J 29/44* (2013.01); *B01D 53/9418* (2013.01); *B01J 23/44* (2013.01); *B01J 29/80* (2013.01); *B01J 35/0006* (2013.01); *B01J 35/0026* (2013.01); *B01J 35/023* (2013.01); *B01J 35/04* (2013.01); *B01J 37/0054* (2013.01); *B01J 37/038* (2013.01); *F01N 3/0222* (2013.01); *F01N 3/035* (2013.01); *B01D 2255/1021* (2013.01); *B01D 2255/1023* (2013.01); *B01D 2255/504* (2013.01); *B01J 29/763* (2013.01); *F01N 2370/04* (2013.01)

(58) Field of Classification Search
CPC ............... B01D 1/06; B01D 1/02; B01D 1/12; C23C 24/04; F01N 3/281; F01N 2013/026; F01N 3/26
USPC ........ 422/177, 180; 427/180, 203, 206, 236, 427/244
See application file for complete search history.

(56) References Cited

U.S. PATENT DOCUMENTS

2008/0292519 A1*  11/2008  Caudle ..................... B01J 23/42
                                                                  423/237

FOREIGN PATENT DOCUMENTS

EP            1775022 A1 *   4/2007

* cited by examiner

*Primary Examiner* — Tom P Duong
(74) *Attorney, Agent, or Firm* — Gary D. Mangels

(57) ABSTRACT

A method of making a filter for filtering particulate matter from exhaust gas emitted from a lean-burn internal combustion engine, which filter comprising a porous substrate having inlet surfaces and outlet surfaces, wherein the inlet surfaces are separated from the outlet surfaces by a porous structure containing pores of a first mean pore size, wherein the inlet surfaces comprise a bridge network comprising interconnected particles of refractory material over the pores of the porous structure, which method comprising the step of contacting inlet surfaces of the filter substrate with an aerosol comprising refractory material in dry powder form. The invention also relates to a filter obtainable by such method.

12 Claims, 13 Drawing Sheets

FIGURE 11

DIESEL PARTICULATE FILTER

CROSS-REFERENCE TO RELATED APPLICATIONS

This application is a divisional of U.S. application Ser. No. 13/701,306 (U.S. Pat. No. 9,352,277), filed on Apr. 4, 2013, which is the national stage (371) of PCT/IB2011/001205, filed Jun. 2, 2011, which claims priority to U.S. Provisional Patent Application No. 61/350,889, filed Jun. 2, 2010, each of which is incorporated herein by reference.

FIELD OF THE INVENTION

The present invention relates to a filter for filtering particulate matter from exhaust gas emitted from a lean-burn internal combustion engine. In particular the invention relates to an enhancement of a filter comprising a porous substrate having inlet surfaces and outlet surfaces, wherein the inlet surfaces are separated from the outlet surfaces by a porous structure containing pores of a first mean pore size.

BACKGROUND OF THE INVENTION

There are concerns about emissions of particulate matter (PM), commonly referred to as soot, from internal combustion engines and especially from Diesel engines in automotive applications that operate in populated urban areas. The main concerns are associated with potential health effects, and most recently with very tiny particles having sizes in the nanometer range. Nanoparticles around 100 nm in size are often referred to as an accumulation mode, and the very tiny particles around 10 nm as a nucleation mode. Nanoparticles when inhaled can penetrate deeply into the lungs and from there can easily enter the blood stream and thence travel to all of the organs of the body where they can cause a variety of problems. There is also evidence that nanoparticles can translocate along nerves from the olfactory glands directly into the brain of animals. Because of these concerns the maximum amount of tailpipe particulate emissions from Diesel powered passenger cars and heavy duty vehicles is limited by legislation that has decreased over recent years in step with concern about environmental impact. Until recently these emissions limits were expressed in grams and the current European passenger car limit of 5 mg/km (Euro 5) demands the fitment of exhaust gas filters to achieve such low levels.

Diesel particulate filters (DPFs) have been fabricated using a variety of materials including sintered metal, ceramic or metal fibres etc, with the most common type in actual mass production being the wall-flow kind made from porous ceramic material fabricated in the form of a monolithic array of many small channels running along the length of the body. Alternate channels are plugged at one end so the exhaust gas is forced through the porous ceramic channel walls that prevent most of the particulate from passing through so only filtered gas enters the environment. Ceramic wall-flow filters in commercial production include those made from cordierite, various forms of silicon carbide and aluminium titanate. The actual shape and dimensions of practical filters on vehicles as well as properties such as the channel wall thickness and its porosity etc. depend on the application concerned.

The average dimensions of the pores in the filter channel walls of a ceramic wall-flow filter through which the gas passes are typically in the range 10 to 50 μm and usually about 20 μm. In marked contrast, the size of most Diesel particulate matter from a modern passenger car high speed Diesel engine is very much smaller, e.g. 10 to 200 nm, so they ought to be able to pass through the filter unheeded, and this is indeed what happens when exhaust gas passes through a clean filter for the first time. However, some PM is retained within the pore structure in the filter walls and this gradually builds up until the pores are bridged over by a network of PM and this PM network then enables the easy formation of a cake of particulate on the internal walls of the filter channels. The particulate cake is an excellent filter medium and its presence affords very high filtration efficiency.

Periodically it is necessary to remove trapped PM from a filter to prevent the build-up of excessive backpressure that is detrimental to engine performance and can cause poor fuel economy. So in Diesel applications, retained PM is removed from the filter by burning it in air in a process during which the amount of air available and the amount of excess fuel used to achieve the high temperature needed to ignite the retained PM are very carefully controlled. Towards the end of this process that is usually called regeneration, the removal of the last remaining particulate in the filter leads to a marked decrease in filtration efficiency and release of a burst of many small particles into the environment. Thus, filters have low filtration efficiency when they are first used and subsequently after each regeneration event and also during the latter part of each regeneration process.

Previously the legislative particulate emissions limits were on a weight basis and so were biased towards the larger heavier particles. Now a particle number measurement is being introduced, which for diesel passenger cars is 6.0× $10^{11}$ for new models from 1 Sep. 2011 (Euro 5b limit values) and the same for Euro 6b limit values (implementation date to be confirmed), and this has a bias towards the smaller, environmentally more dangerous particles. A further practical reason for this change is because the mass of particles permitted has been progressively lowered and is now at a level where determining them by weighting very small masses is practically difficult. With the introduction of particle number legislation it is very important to maintain filtration efficiency at all times—emissions during regeneration and immediately afterwards can be a very significant contribution to what is permitted overall and as a result present Diesel filtration systems in particular are not adequate to meet the new legislative requirements.

There is a related problem with filters for gasoline spark ignition engines that operate at much higher temperatures than those prevailing in the exhaust gas of Diesel engines, and especially those of Diesel passenger cars. Direct injection gasoline engines are particularly prone to forming relatively high levels of exhaust particulate matter. Here the temperature can be so high particulate matter is burnt soon after it is retained in the filter so a significant amount of particulate cake is never formed in the filter and high filtration efficiency is never achieved.

It is known to catalyse filters for particular applications. For example, U.S. Pat. No. 4,477,417 (the entire contents of which are incorporated herein by reference) discloses a catalyst for reducing the ignition temperature of diesel soot.

There is therefore a major requirement for a means of improving the filtration efficiency of filters without causing additional backpressure to the filtration system.

EP 2158956 (the entire contents of which is incorporated herein by reference) discloses a honeycomb filter of the wall-flow type and a surface layer provided only on an inflow side partition wall or both the inflow side and outflow side partition wall. The document discloses specifically two honeycomb filter embodiments and five honeycomb filter manufacturing methods. The surface layer in the first or second honeycomb filter preferably carries fine particles of one or both of platinum and palladium and complies with the following conditions: (1) the peak pore diameter of the surface layer is equal to or smaller than the average pore diameter of the partition wall base material, and the porosity of the surface layer is larger than that of the partition wall base material; (2) the surface layer has a peak pore diameter of 0.3 μm or more and less than 20 μm and a porosity of 60% or more and less than 95% (measurement method is mercury porosimetry); (3) the thickness L1 of the surface layer is 0.5% or more and less than 30% of the thickness L2 of the partition walls; (4) the mass of the surface layer per filtration area is 0.01 mg/cm$^2$ or more and less than 6 mg/cm$^2$; and (5) the partition wall base material has an average pore diameter of 10 μm or more and less than 60 μm and a porosity of 40% or more and less than 65%. The five honeycomb filter manufacturing methods comprise preparing a slurry comprising at least one fibrous material and applying the slurry to the honeycomb filter substrate by an atomisation process using e.g. a needle-like atomiser.

Society of Automotive Engineers (SAE) Technical Paper 2008-01-0621 from the 2008 World Congress held in Detroit, Mich. Apr. 14-17, 2008 by the authors of EP 2158956 describes using a surface layer of CeO$_2$-based material having 300 nm particle size at a loading of 15 g/l (no precious metal) on a silicon carbide diesel particulate filter.

SUMMARY OF THE INVENTION

We have investigated coating uncatalysed filters having the surface layer disclosed in EP 2158956 and we have found that they are unsatisfactory: standard washcoat formulations for coating catalysed soot filters produce a coated filter that gives excessive backpressure in use; sol-based formulations were less durable and higher platinum group metal loadings were inaccessible because of difficulties in chemically depositing the metal.

We have now discovered, very surprisingly, that by depositing a particulate refractory material in the form of an aerosol on inlet surfaces of a filter to form a bridge network thereon, the resulting filter can trap the same quantity of particulate matter from an exhaust gas of an internal engine at a lower backpressure compared with a traditional filter, wherein a washcoat permeates the porous structure of the filter.

According to one aspect, the invention provides a method of making a filter for filtering particulate matter from exhaust gas emitted from an internal combustion engine, preferably a lean burn Diesel engine or a fuel injected gas engine, which filter comprising a porous substrate having inlet surfaces and outlet surfaces, wherein the inlet surfaces are separated from the outlet surfaces by a porous structure containing pores of a first mean pore size, wherein the inlet surfaces comprise a bridge network comprising interconnected particles of refractory material over the pores of the porous structure, which method comprising the step of contacting inlet surfaces of the filter substrate with an aerosol comprising refractory material in dry powder form.

BRIEF DESCRIPTION OF THE DRAWINGS

The invention may be more fully understood with reference to the accompanying drawings, in which:

FIG. 11 is a graph comparing the filtration efficiency of a prior art SCR catalysed filter with the same prior art filter including dry catalysed refractory material powder on inlet surfaces according to the present invention;

DETAILED DESCRIPTION OF THE INVENTION

Figure 1:
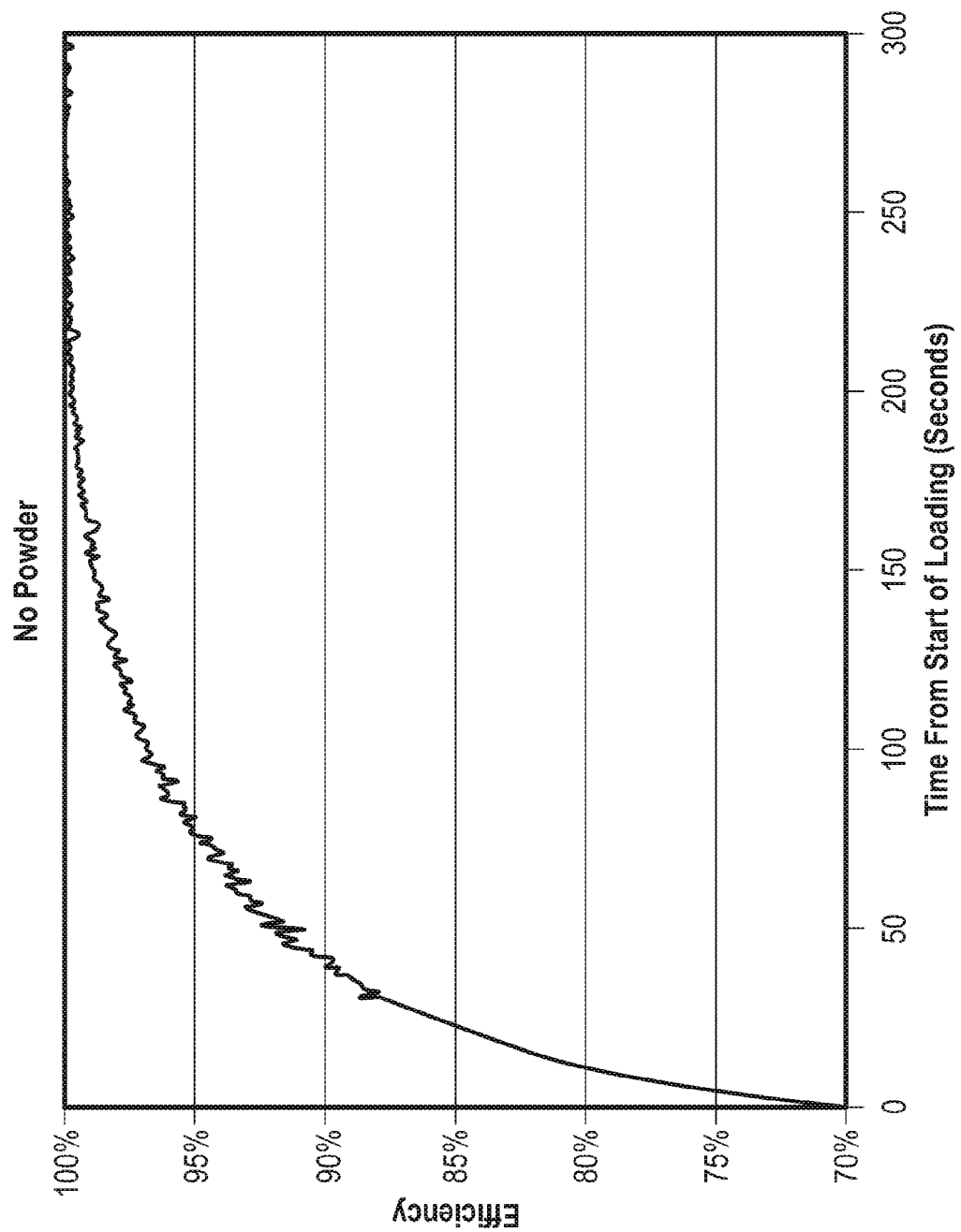
FIG. 1 is a graph showing the filtration efficiency plotted against time for a prior art (comparative) catalysed filter.

The present invention provides a means of improving the filtration efficiency of filters and especially wall-flow filters at all times while reducing the backpressure when the filter contains a given amount of trapped particulate matter. The filter can be a "bare" filter or one with incorporated catalytic function ability such as oxidation, NO$_x$-trapping, or selective catalytic reduction activity. We discovered that the introduction of a small amount of an appropriately fine inorganic refractory material into the inlet side of a wall-flow filter in the form of a fine dry aerosol can result in improved filtration performance under all operating conditions, and also provides the important benefit of lower backpressure at given particulate loadings under operating conditions present in Diesel and gasoline engine exhaust gas applications.

It is believed that the mechanism of the way the added inorganic material works the following properties of the inorganic material are important variables:

1. It can be of a suitable small size (less than 10 μm and preferably between 0.2 and 5.0 μm) so it can be applied to the inlet side of a filter as an aerosol in a flow of gas, preferably air;
2. Its size can be such it substantially does not enter the pores of the filter walls, and that it forms a bridge network over them. The actual optimal average size depends on the characteristics of filter concerned. In practice we found the size can be larger than 0.2 μm when using filters with mean pore diameters about 15.0-20.0 μm;
3. That the bridged structure over the pores can be porous so as to allow gas flow through them and to facilitate the growth of particulate cake when exposed to exhaust gas. Expressing porosity in terms of bulk density powders prior to introduction as an aerosol that perform well have bulk densities in the range 0.1-0.6 g/cm$^3$;
4. That the inorganic material is sufficiently refractory to withstand high temperatures such as those experienced during regeneration on Diesel engines and miss-fire episodes on gasoline engines. Typically it should have a melting point (softening temperature) above 1000° C.; and
5. The surface texture can be such that the particles tend to interlock and are not readily removed from the filter. This property is reflected in part in a low bulk density referred to below.

The bridge network for use in the present invention is different from a traditional washcoat applied to a substrate monolith. In a traditional washcoat, one is depositing discrete particles and the void space in the washcoat is defined inter alia by the packing of the particles. In the bridge network of the present invention, the void space is formed by the interconnectivity of the particles, which interact to form the bridge network.

It is relevant that the pore size of the filter material and the size of the inorganic material particles are tailored for optimum performance. Thus the size of a particular inorganic material that provides outstanding results in one filter type could be quite inappropriate fof use in a filter with a larger pore structure. Materials that perform well have aerodynamic properties that facilitate easy formation of an aerosol, and generally have bulk densities less than 1 g/cm$^3$, and typically in the range 0.05 to 0.5 g/cm$^3$, and preferably in the range 0.1 to 0.4 g/cm$^3$, wherein said bulk density is measured under conditions suitable for aerosol application and/or for application on the filter. The low bulk density shows the particles of the material have tendency to lock together, a property needed when bridging over pore entrances in the filter walls. The amount of material added to a filter 5.66 inch (14.4 cm) in diameter and 7 inches (17.8 cm) long is typically 2 to 100 g and preferably 5 to 50 g, and pro rata amounts for different sizes of filter.

In embodiments, the refractory material can be based on an oxide selected from the group consisting of alumina, silica, zirconia, ceria, chromia, magnesia, calcia, titania and mixed oxides of any two or more thereof. Alternatively, or in addition, the refractory material can comprise a molecular sieve. The molecular sieve can be a silicate zeolite, an aluminosilicate zeolite, a metal-substituted aluminosilicate zeolite or a non-zeolitic molecular sieve. Where a non-zeolitic molecular sieve is used, the or each non-zeolitic molecular sieve can be an AlPO, a MeAlPO, a SAPO or a MeAPSO. Molecular sieves having the CHA structure are particularly preferred, such as SAPO-34 or SSZ-13.

Major advantages of the present invention include filters that contain catalyst in the filter walls can be treated after they have been catalysed and so not interfere with the process of introducing catalyst into the pores in the filter walls. Moreover, no high temperature processing procedure is required that might be detrimental to the catalyst. Alternative procedures that treat the filter before the catalysing step can seriously complicate applying catalyst, and in the extreme prevent this from being done.

Accordingly, in preferred embodiments, the filter substrate comprises a catalyst composition (known as a washcoat) that permeates the porous structure of the filter.

The washcoat for use in the filter of the invention is a catalytic washcoat, and in embodiments is selected from the group consisting of a hydrocarbon trap, a three-way catalyst (TWC), a $NO_x$ absorber, an oxidation catalyst, a selective catalytic reduction (SCR) catalyst, a lean $NO_x$ catalyst and combinations of any two or more thereof. For example, in particular embodiments, inlet surfaces are coated with a TWC washcoat or $NO_x$ absorber composition and the outlet surfaces are coated with SCR washcoat. In this arrangement, intermittent rich running of the engine, e.g. to regenerate the $NO_x$ absorption capacity of the $NO_x$ absorber, can generate ammonia in situ on the TWC or $NO_x$ absorber for use in reducing $NO_x$ on SCR catalyst on the outlet surfaces. Similarly, an oxidation catalyst can include hydrocarbon trap functionality. In one embodiment, the inlet surfaces are not coated with SCR catalyst.

The catalytic washcoat, such as the TWC, NO absorber, oxidation catalyst, hydrocarbon trap and the lean $NO_x$ catalyst, can contain one or more platinum group metals, particularly those selected from the group consisting of platinum, palladium and rhodium.

TWCs are intended to catalyse three simultaneous reactions: (i) oxidation of carbon monoxide to carbon dioxide, (ii) oxidation of unburned hydrocarbons to carbon dioxide and water; and (iii) reduction of nitrogen oxides to nitrogen and oxygen. These three reactions occur most efficiently when the TWC receives exhaust from an engine running at or about the stoichiometric point. As is well known in the art, the quantity of carbon monoxide (CO), unburned hydrocarbons (FTC) and nitrogen oxides ($NO_x$) emitted when gasoline fuel is combusted in a positive ignition (e.g. spark-ignited) internal combustion engine is influenced predominantly by the air-to-fuel ratio in the combustion cylinder. An exhaust gas having a stoichiometrically balanced composition is one in which the concentrations of oxidising gases ($NO_x$ and $O_2$) and reducing gases (HC and CO) are substantially matched. The air-to-fuel ratio that produces the stoichiometrically balanced exhaust gas composition is typically given as 14.7:1.

Theoretically, it should be possible to achieve complete conversion of $O_2$, $NO_x$, CO and HC in a stoichiometrically balanced exhaust gas composition to $CO_2$, $H_2O$ and $N_2$ and this is the duty of the three-way catalyst. Ideally, therefore, the engine should be operated in such a way that the air-to-fuel ratio of the combustion mixture produces the stoichiometrically balanced exhaust gas composition.

A way of defining the compositional balance between oxidising gases and reducing gases of the exhaust gas is the lambda (λ) value of the exhaust gas, which can be defined according to equation (1) as:

$$\text{Actual engine air-to-fuel ratio/Stoichiometric engine air-to-fuel ratio,} \qquad (1)$$

wherein a lambda value of 1 represents a stoichiometrically balanced (or stoichiometric) exhaust gas composition, wherein a lambda value of >1 represents an excess of $O_2$ and $NO_x$ and the composition is described as "lean" and wherein a lambda value of <1 represents an excess of HC and CO and the composition is described as "rich". It is also common in the art to refer to the air-to-fuel ratio at which the engine operates as "stoichiometric", "lean" or "rich", depending on the exhaust gas composition which the air-to-fuel ratio generates: hence stoichiometrically-operated gasoline engine or lean-burn gasoline engine.

It should be appreciated that the reduction of $NO_x$ to $N_2$ using a TWC is less efficient when the exhaust gas composition is lean of stoichiometric. Equally, the TWC is less able to oxidise CO and HC when the exhaust gas composition is rich. The challenge, therefore, is to maintain the composition of the exhaust gas flowing into the TWC at as close to the stoichiometric composition as possible.

Of course, when the engine is in steady state it is relatively easy to ensure that the air-to-fuel ratio is stoichiometric. However, when the engine is used to propel a vehicle, the quantity of fuel required changes transiently depending upon the load demand placed on the engine by the driver. This makes controlling the air-to-fuel ratio so that a stoichiometric exhaust gas is generated for three-way conversion particularly difficult. In practice, the air-to-fuel ratio is controlled by an engine control unit, which receives information about the exhaust gas composition from an exhaust gas oxygen (EGO) (or lambda) sensor: a so-called closed loop feedback system. A feature of such a system is that the air-to-fuel ratio oscillates (or perturbates) between slightly rich of the stoichiometric (or control set) point and slightly lean, because there is a time lag associated with adjusting air-to-fuel ratio. This perturbation is characterised by the amplitude of the air-to-fuel ratio and the response frequency (Hz).

The active components in a typical TWC comprise one or both of platinum and palladium in combination with rhodium, or even palladium only (no rhodium), supported on a high surface area oxide, and an oxygen storage component.

When the exhaust gas composition is slightly rich of the set point, there is a need for a small amount of oxygen to consume the unreacted CO and HC, i.e. to make the reaction more stoichiometric. Conversely, when the exhaust gas goes slightly lean, the excess oxygen needs to be consumed. This was achieved by the development of the oxygen storage component that liberates or absorbs oxygen during the perturbations. The most commonly used oxygen storage component (OSC) in modern TWCs is cerium oxide ($CeO_2$) or a mixed oxide containing cerium, e.g. a Ce/Zr mixed oxide.

$NO_x$ absorber catalysts (NACs) are known e.g. from U.S. Pat. No. 5,473,887 (the entire contents of which is incorporated herein by reference) and are designed to adsorb nitrogen oxides ($NO_x$) from lean exhaust gas (lambda >1) and to desorb the $NO_x$ when the oxygen concentration in the exhaust gas is decreased. Desorbed $NO_x$ may be reduced to $N_2$ with a suitable reductant, e.g. gasoline fuel, promoted by a catalyst component, such as rhodium, of the NAC itself or located downstream of the NAC. In practice, control of oxygen concentration can be adjusted to a desired redox composition intermittently in response to a calculated remaining $NO_x$ adsorption capacity of the NAC, e.g. richer than normal engine running operation (but still lean of stoichiometric or lambda=1 composition), stoichiometric or rich of stoichiometric (lambda <1). The oxygen concentration can be adjusted by a number of means, e.g. throttling, injection of additional hydrocarbon fuel into an engine cylinder such as during the exhaust stroke or injecting hydrocarbon fuel directly into exhaust gas downstream of an engine manifold.

A typical NAC formulation includes a catalytic oxidation component, such as platinum, a significant quantity, i.e. substantially more than is required for use as a promoter such as a promoter in a TWC, of a $NO_x$-storage component, such as barium, and a reduction catalyst, e.g. rhodium. One mechanism commonly given for $NO_x$-storage from a lean exhaust gas for this formulation is:

$$NO + \tfrac{1}{2}O_2 \rightarrow NO_2 \qquad (2); \text{ and}$$

$$BaO + NO_2 + \tfrac{1}{2}O_2 \rightarrow Ba(NO_3)_2 \qquad (3),$$

wherein in reaction (2), the nitric oxide reacts with oxygen on active oxidation sites on the platinum to form $NO_2$. Reaction (3) involves adsorption of the $NO_2$ by the storage material in the form of an inorganic nitrate.

At lower oxygen concentrations and/or at elevated temperatures, the nitrate species become thermodynamically unstable and decompose, producing NO or $NO_2$ according to reaction (4) below. In the presence of a suitable reductant, these nitrogen oxides are subsequently reduced by carbon monoxide, hydrogen and hydrocarbons to $N_2$, which can take place over the reduction catalyst (see reaction (5)).

$$Ba(NO_3)_2 \rightarrow BaO + 2NO + 3/2 O_2 \text{ or } Ba(NO_3)_2 \rightarrow BaO + 2NO_2 + \tfrac{1}{2}O_2 \qquad (4); \text{ and}$$

$$NO + CO \rightarrow \tfrac{1}{2}N_2 + CO_2 \qquad (5);$$

(Other reactions include $Ba(NO_3)_2 + 8H_2 \rightarrow BaO + 2NH_3 + 5H_2O$ followed by $NH_3 + NO_x \rightarrow N_2 + yH_2O$ or $2NH_3 + 2O_2 + CO \rightarrow N_2 + 3H_2O + CO_2$ etc.).

In the reactions of (2)-(5) above, the reactive barium species is given as the oxide. However, it is understood that in the presence of air most of the barium is in the form of the carbonate or possibly the hydroxide. The skilled person can adapt the above reaction schemes accordingly for species of barium other than the oxide and sequence of catalytic coatings in the exhaust stream.

Oxidation catalysts promote the oxidation of carbon monoxide to carbon dioxide and unburned hydrocarbons to carbon dioxide to water. Typical oxidation catalysts include platinum and/or palladium on a high surface area support.

Hydrocarbon traps typically include molecular sieves and may also be catalysed e.g. with a platinum group metal such as platinum or a combination of both platinum and palladium.

SCR catalysts can be selected from the group consisting of at least one of Cu, Hf, La, Au, In, V, lanthanides and Group VIII transition metals, such as Fe, supported on a refractory oxide or molecular sieve. Suitable refractory oxides include $Al_2O_3$, $TiO_2$, $CeO_2$, $SiO_2$, $ZrO_2$ and mixed oxides containing two or more thereof. The non-zeolite catalyst can also include tungsten oxide, e.g. $V_2O_5/WO_3/TiO_2$.

Lean $NO_x$ catalysts, sometimes also called hydrocarbon-SCR catalysts, DeNO_x catalysts or even non-selective catalytic reduction catalysts, include $Pt/Al_2O_3$, Cu- Pt-, Fe-, Co- or Ir-exchanged ZSM-5, protonated zeolites such as H-ZSM-5 or H-Y zeolites, perovskites and $Ag/Al_2O_3$. In selective catalytic reduction (SCR) by hydrocarbons (HC), HC react with $NO_x$, rather than with $O_2$, to form nitrogen, $CO_2$ and water according to equation (6):

$$\{HC\} + NO_x \rightarrow N_2 + CO_2 + H_2O \qquad (6)$$

The competitive, non-selective reaction with oxygen is given by Equation (7):

$$\{HC\} + O_2 \rightarrow CO_2 + H_2O \quad (7)$$

Therefore, good HC-SCR catalysts are more selective for reaction (6) than reaction (7).

In particular embodiments, the washcoat comprises at least one molecular sieve, such as an aluminosilicate zeolite or a SAPO, for trapping positive ignition PM. The at least one molecular sieve can be a small, a medium or a large pore molecular sieve, for example. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts—see for example WO 2008/132452 (the entire contents of which is incorporated herein by reference).

Particular molecular sieves with application in the present invention are selected from the group consisting of AEI, ZSM-5, ZSM-20, ERI including ZSM-34, mordenite, ferrierite, BEA including Beta, Y, CHA, LEV including Nu-3, MCM-22 and EU-1.

In embodiments, the molecular sieves can be un-metallised or metallised with at least one metal selected from the group consisting of groups IB, IIB, IIIA, IIIB, VB, VIB, VIB and VIII of the periodic table. Where metallised, the metal can be selected from the group consisting of Cr, Co, Cu, Fe, Hf, La, Ce, In, V, Mn, Ni, Zn, Ga and the precious metals Ag, Au, Pt, Pd and Rh. Such metallised molecular sieves can be used in a process for selectively catalysing the reduction of nitrogen oxides in positive ignition exhaust gas using a reductant. By "metallised" herein we mean to include molecular sieves including one or more metals incorporated into a framework of the molecular sieve e.g. Fe in-framework Beta and Cu in-framework CHA. As mentioned above, where the reductant is a hydrocarbon, the process is sometimes called "hydrocarbon selective catalytic reduction (HC-SCR)", "lean $NO_x$ catalysis" or "$DeNO_x$ catalysis", and particular metals for this application include Cu, Pt, Mn, Fe, Co, Ni, Zn, Ag, Ce, Ga. Hydrocarbon reductant can either be introduced into exhaust gas by engine management techniques, e.g. late post injection or early post injection (so-called "after injection").

Where the reductant is a nitrogenous reductant (so-called "$NH_3$—SCR"), metals of particular interest are selected from the group consisting of Ce, Fe and Cu. Suitable nitrogenous reductants include ammonia. Ammonia can be generated in situ e.g. during rich regeneration of a NAC disposed upstream of the filter or by contacting a TWC with engine-derived rich exhaust gas (see the alternatives to reactions (4) and (5) hereinabove). Alternatively, the nitrogenous reductant or a precursor thereof can be injected directly into the exhaust gas. Suitable precursors include ammonium formate, urea and ammonium carbamate. Decomposition of the precursor to ammonia and other by-products can be by hydrothermal or catalytic hydrolysis.

Methods of coating porous filter substrates are known to the skilled person and include, without limitation, the method disclosed in WO 99/47260, i.e. a method of coating a monolithic support, comprising the steps of (a) locating a containment means on top of a support, (b) dosing a pre-determined quantity of a liquid component into said containment means, either in the order (a) then (b) or (b) then (a), and (c) by applying pressure or vacuum, drawing said liquid component into at least a portion of the support, and retaining substantially all of said quantity within the support. Such process steps can be repeated from another end of the monolithic support following drying of the first coating with optional firing/calcination.

Further methods include that disclosed in UK patent application no. 1000019.8 and entitled "Coating a Monolith Substrate With Catalyst Component" filed on 4 Jan. 2010, i.e. a method of coating a honeycomb monolith substrate comprising a plurality of channels with a liquid comprising a catalyst component, which method comprising the steps of: (i) holding a honeycomb monolith substrate substantially vertically; (ii) introducing a pre-determined volume of the liquid into the substrate via open ends of the channels at a lower end of the substrate; (iii) sealingly retaining the introduced liquid within the substrate; (iv) inverting the substrate containing the retained liquid; and (v) applying a vacuum to open ends of the channels of the substrate at the inverted, lower end of the substrate to draw the liquid along the channels of the substrate. Washcoat viscosity can be selected as appropriate. Particle size can be selected according to the mean pore size of the porous filter structure. So, for wallflow filters having a mean pore size of about 11 µm, a washcoat having a D50 of 2.5 µm may be desirable, whereas for a wallflow filter having a mean pore size of 22 µm, a D90 of 5 µm may be more appropriate.

The washcoat loading of the catalyst composition that permeates the porous structure of the filter substrate will generally be less than 2.5 g/in$^3$, such as <2.0 g/in$^3$, 1.5 g/in$^3$, <1.3 g/in$^3$, 1.2 g/in$^3$, 1.1 g/in$^3$, 1.0 g/in$^3$ or <0.8 g/in$^3$ etc.

In further preferred embodiments, the bridge network comprises a catalyst. Such catalyst can be selected from the group consisting of TWC, $NO_x$ absorber, oxidation catalyst, hydrocarbon trap and the lean $NO_x$ catalyst, can contain one or more platinum group metals, particularly those selected from the group consisting of platinum, palladium and rhodium. Particular embodiments comprise both a catalyst composition that permeates the porous filter structure and a bridge network comprising a catalyst. Where both the porous filter structure and the bridge network comprise a catalyst composition, the catalysts in each of the porous filter structure and the bridge network can be the same or different.

The benefits of the invention can be obtained for refractory material powder loading per unit volume of less than 1.2 g/in$^3$, such as <1.0 g/in$^3$, <0.8 g/in$^3$, <0.7 g/in$^3$, <0.6 g/in$^3$, <0.5 g/in$^3$, <0.3 g/in$^3$ etc.

A filter wherein the bridge network comprises a catalyst is advantageous for a number of reasons. Typically, a catalyst composition is washcoated on a filter substrate so that the washcoat permeates the walls of the filter substrate. However, the pore structure of a filter substrate, such as a wallflow filter, is not perfect and some washcoat can become trapped in "dead ended" pores, where no catalytic activity is possible. This makes the catalyst as a whole a less efficient catalyst. By including the catalyst in the bridge network, the catalyst can be more efficiently utilised. Thus, even when it is decided to include both a bridge network and a catalyst composition that permeates the porous structure of the filter, less catalyst composition can be used in the porous structure to achieve the same catalytic activity as a prior art filter substrate wherein the catalyst is wholly located in the porous structure of the filter substrate.

A further significant advantage is that the same catalytic activity can be obtained as a prior art catalysed filter substrate, without the same increase in backpressure. For example, EP 1663458 (the entire contents of which is incorporated herein by reference) discloses a SCR filter, wherein the filter is a wallflow monolith and wherein an SCR catalyst composition permeates walls of the wallflow monolith. EP 1663458 discloses generally that the walls of the wallflow filter can contain thereon or therein (i.e. not both) one or more catalytic materials. According to the disclosure, "permeate", when used to describe the dispersion of a catalyst slurry on the wallflow monolith substrate, means the catalyst composition is dispersed throughout the wall of the substrate. The claims require a washcoat loading of >1.3 g/in$^3$. The present invention enables the same washcoat loadings at lower backpressure.

In one embodiment, the catalyst—that permeates the porous structure of the filter and/or comprises the bridge network—promotes reduction of oxides of nitrogen in an exhaust gas of a lean-burn internal combustion engine in the presence of a suitable reductant. Suitable reductants include hydrocarbons such as engine fuel and nitrogenous reductants, especially ammonia and its precursor urea. The process of catalytically reducing oxides of nitrogen using a reductant is called "selective catalytic reduction" or "SCR". Processes using a nitrogenous reductant are particularly preferred.

Surprisingly the powder when introduced into a wall-flow filter is retained and not easily shaken out. Without wishing to be bound by any theory, we believe that this interconnectedness results from van der Waals forces. If however it is necessary to bind the powder in place this can be done by treatment with, for example, polydimethylsiloxane, which when hydrolysed at sufficiently high temperature forms reactive silica that can react with the powder so cementing the particles.

Refractory materials described hereinabove can be inherently catalytic for particular processes. However, according to preferred embodiments, the refractory materials comprise a metal promoter selected from the group consisting of precious metals, Cr, Ce, Mn, Fe, Co, Ni and Cu and mixtures of any two or more thereof. Preferred catalysts include CuCHA, such as Cu-SAPO-34, Cu-SSZ-13 and Fe-Beta zeolite, where either the Fe is present in the framework of the molecular sieve structure and/or otherwise associated e.g. ion-exchanged with the framework structure.

The aerosol can comprise an additive for binding the interconnected particles together after the filter including the bridging network is fired, e.g. the polydimethylsiloxane mentioned hereinabove.

The porous substrate can be a metal, such as a sintered metal, or a ceramic, e.g. silicon carbide, cordierite, aluminium nitride, silicon nitride, aluminium titanate, alumina, cordierite, mullite e.g., acicular mullite (see e.g. WO 01/16050, the entire contents of which is incorporated herein by reference), pollucite, a thermet such as Al$_2$O$_3$/Fe, Al$_2$O$_3$/Ni or B$_4$C/Fe, or composites comprising segments of any two or more thereof. In a preferred embodiment, the filter is a wallflow filter comprising a ceramic porous filter substrate having a plurality of inlet channels and a plurality of outlet channels, wherein each inlet channel and each outlet channel is defined in part by a ceramic wall of porous structure, wherein each inlet channel is separated from an outlet channel by a ceramic wall of porous structure. This filter arrangement is also disclosed in SAE 810114 (the entire contents of which is incorporated herein by reference), and reference can be made to this document for further details. Alternatively, the filter can be a foam, or a so-called partial filter, such as those disclosed in EP 1057519 (the entire contents of which is incorporated herein by reference) or WO 01/080978 (the entire contents of which is incorporated herein by reference).

According to a further aspect, the invention provides a filter obtainable by the method according to the present invention. A method of obtaining a filter according to the invention is disclosed in Example 2 hereinbelow.

According to a further aspect, the invention provides a filter for filtering particulate matter from exhaust gas emitted from a lean-burn internal combustion engine, which filter comprising a porous substrate having inlet surfaces and outlet surfaces, wherein the inlet surfaces are separated from the outlet surfaces by a porous structure containing pores of a first mean pore size, wherein the filter substrate comprises a catalyst composition that permeates the porous structure of the filter and wherein the inlet surfaces comprise a bridge network comprising interconnected particles of refractory material over the pores of the porous structure.

The arrangement is such that for an identical catalytic loading expressed in weight per unit volume e.g. g/in$^3$, the filter substrate according to the present invention has a lower backpressure in use than a filter comprising an identical catalyst loading which permeates a porous structure of the filter substrate defined by inlet and outlet filter surfaces.

According to a further aspect, the invention provides the use of a filter according to the invention for treating exhaust gas of a lean-burn internal combustion engine, which exhaust gas comprising particulate matter. In a preferred embodiment, the engine is used as the motive force for a vehicle.

EXAMPLES

Comparative Example 1

Filter Catalysed with Oxidation Catalyst—No Added Refractory Material

Diesel exhaust gas containing particulate matter was obtained from a Diesel particulate generator (DPG) operating with standard forecourt pump Diesel fuel containing a maximum of 50 ppm sulphur. This equipment was manufactured by Cambustion Ltd and details of its design and mode of operation are given in our European Patent 1850068 A1 (the entire contents of which is incorporated herein by reference). The DPG unit was operated with a gas mass flow rate of 250 kg/hour, a particulate generation rate of 10 g/hr with an inline particulate silicon carbide filter maintained at about 240° C.

The filter used was a standard production catalysed silicon carbide filter made from silicon carbide cemented extruded segments (about 35×35 mm) having a circular cross-section (5.66 inch diameter) and 7.2 inches (18.3 cm) long. The internal channel dimensions were 1.16 mm×1.16 mm. The channel wall thickness was 0.305 mm and it had a porosity of 45%. The mean pore size estimated from mercury porosimetry measurements was 18 μm. The filter was catalysed with different catalyst formulations in two distinct zones along its length. The front 2.6 inch (6.6 cm) long zone contained platinum and palladium in a 2 to 1 ratio such that the total metal loading in this part of the filter was about 127 g per cubic foot (2.08 g/l). The rear 4.6 inch (11.68 cm) zone also contained platinum and palladium in a 2 to 1 ratio, and the total metal loading in this part of the filter was about 6 g per cubic foot (0.10 g/l). The filter was prepared according to the methods disclosed in WO 99/47260 or UK patent application no. 1000019, as described hereinabove.

Figure 2:
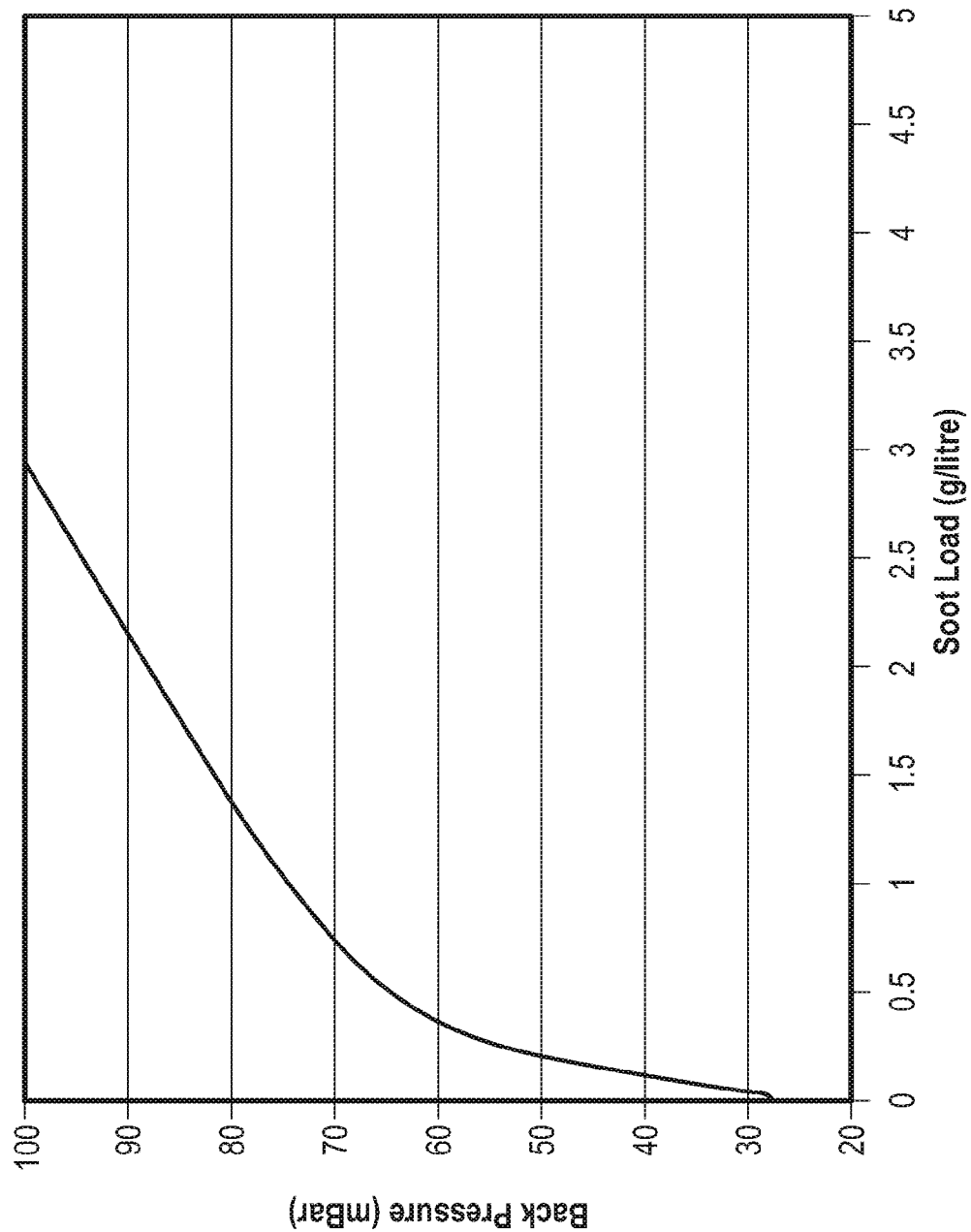
FIG. 2 is a graph showing backpressure plotted against soot loading for the same prior art (comparative) catalysed filter.

During the particulate matter loading of this filter the gas flow rate was 250 kg/hour and the temperature 240° C., and the back pressure was determined by a differential pressure sensor and logged on a computer every 10 seconds. Particles passing through the filter were detected using a Cambustion DMS 500 fast particle mass spectrometer, and particle size distributions were measured every second and logged on a computer. FIG. 1 shows the initial poor filtration efficiency of this filter in terms of particle number and how this gradually improved as increasing amounts of particulate matter were collected in the filter. After some 250 seconds it was calculated some $3 \times 10^{13}$ particles had passed through the filter. After regeneration a series of separate experiments on filters of the same type using condensation particle counting (CPC) instruments confirmed the initial filtration efficiency was less than about 70%. FIG. 2 shows the corresponding increase in backpressure across the filter as increasing amounts of particulate matter were retained in the filter, and that a disproportionately large portion of the backpressure results from the accumulation of a relatively small amount of particulate matter in the filter.

Example 2

Filter Catalysed with Oxidation Catalyst with Added Refractory Material

Figure 3:
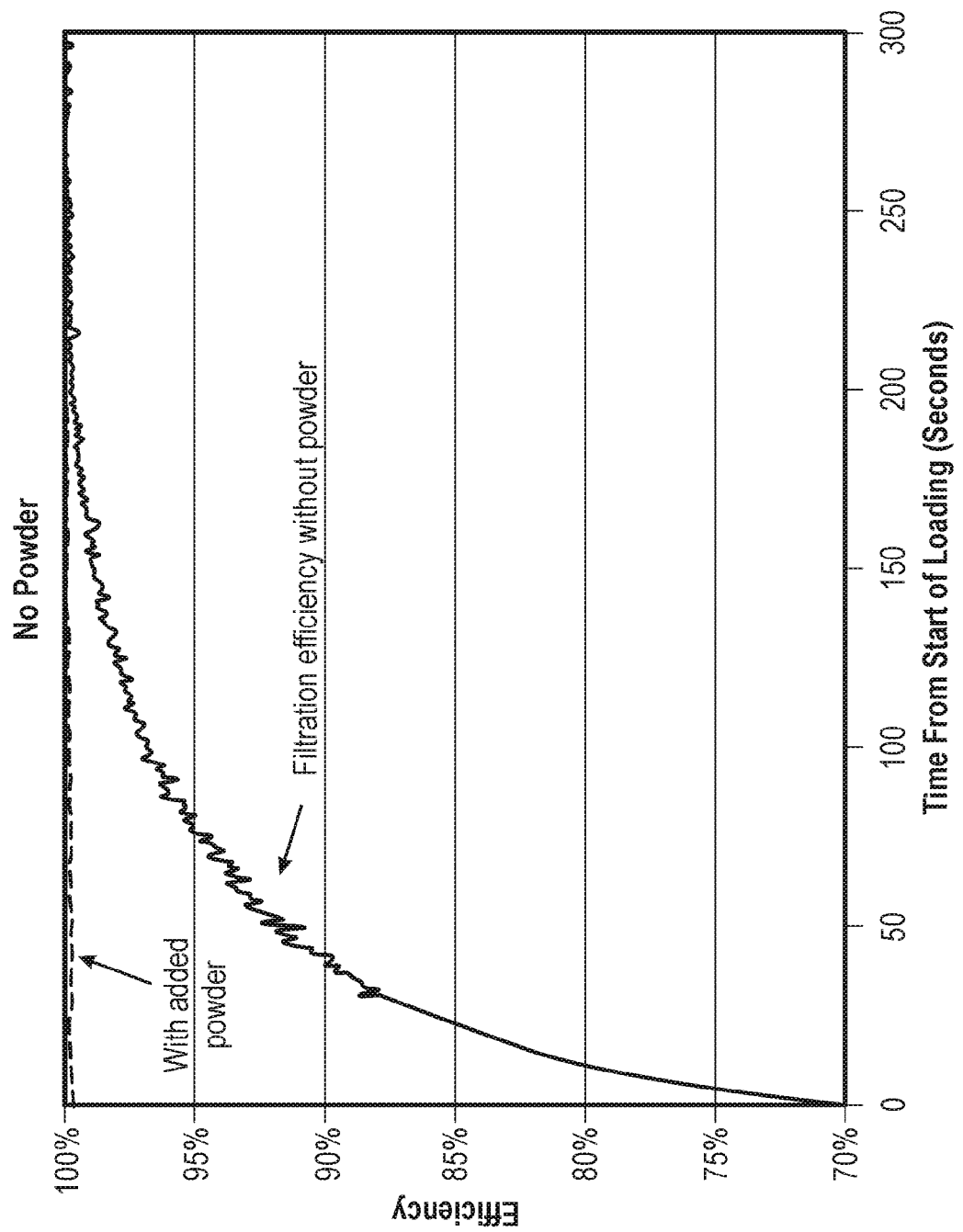
FIG. 3 is as FIG. 1 including a filtration efficiency vs. time plot also of the same prior art (comparative) catalysed filter but now including the refractory material powder bridge network according to the invention.

Dry powder zeolite (ZSM-5, 13 g) that was characterised by a Malvern Mastersizer 2000 as having an average particle size of about 2 μm in the form of an aqueous dispersion was distributed over the inlet side of the filter used in Example 1 after the trapped particulate matter in it had been completely removed by burning with air in an electric furnace maintained at 650° C. for 3 hours. The filter into which the inlet surface bridge network was to be introduced was disposed in the DPG device, which was run in fan only mode without fuel, i.e. without diesel particulate generation, so that a turbulent air flow entered the upstream side of the filter substrate. The zeolite was evenly dispersed over the inlet side of the filter by adding it through a 250 mesh sieve into the upstream turbulent air flow via a boss disposed in a housing of the conduit upstream of the filter so forming an aerosol that was carried into the filter. The particle size of the aerosol was determined to have a distribution centred around 0.2 μm by the Cambustion DMS 500 suggesting as an aqueous dispersion there is considerable agglomeration of the primary particles. The filter was then loaded with particulate matter as in Example 1 using the DPG. The filtration efficiency was monitored as previously described using a Cambustion DMS 500, and the results displayed in FIG. 3. The filtration efficiency was dramatically improved compared to that without the addition of the zeolite powder. Moreover, the backpressure versus particulate loading curve was also dramatically lower compared with when no powder was present, and that this effect was due to a smaller backpressure increase during the initial phase of particulate matter retention in the filter.

The filter was then regenerated in air at 650° C. for 3 hours in an electric furnace and the particulate matter loading process was repeated. The whole particulate matter loading and regeneration cycle was repeated for a total of three times and the measured final filtration efficiency remained very high at all times during particulate matter loading—within experimental error the filtration efficiency was the same (more than 99%) as it was during the first loading after the zeolite powder had been added into the filter.

Figure 4:
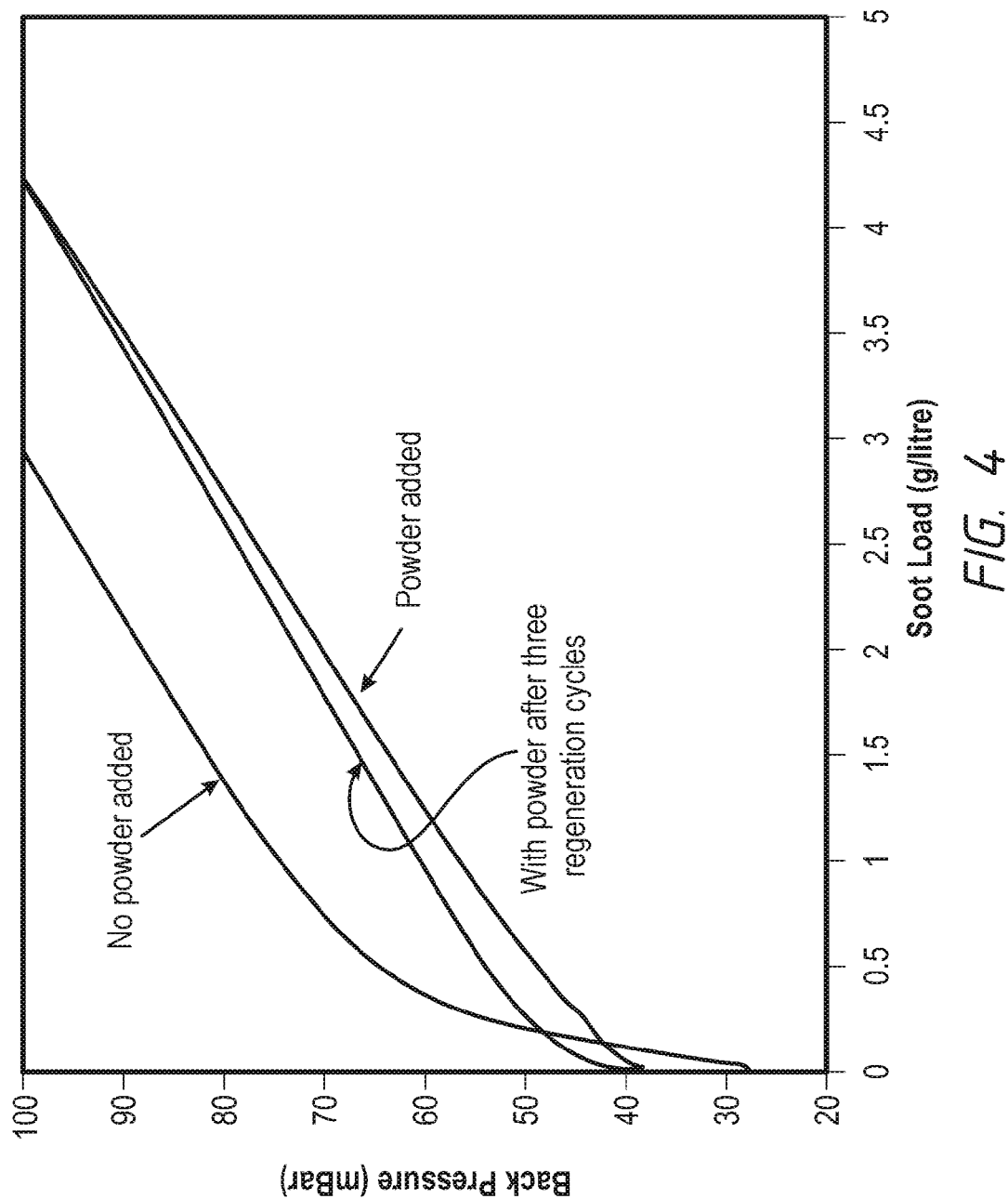
FIG. 4 is as FIG. 2 including a backpressure vs. soot loading plot also of the prior art (comparative) catalysed filter now including the refractory material powder bridge network according to the invention after several filter loading/regeneration cycles.

FIG. 4 shows the back pressure/particulate matter loading curve after several filter loading/regeneration cycles. The backpressure remained much lower than was the initial behaviour with no added powder. Thus the small amount of this added inorganic powder dramatically improved filtration efficiency and produced a highly desirable reduction in backpressure across the filter during normal use.

Comparative Example 3

Filter Catalysed with Selective Catalytic Reduction Catalyst—No Refractory Added Material A silicon carbide filter with circular cross-section (5.66 inch (14.4 cm) diameter) and 6 inches (15.24 cm) long having a channel wall thickness of 0.305 mm and a porosity of 42% and mean pore size of 14 μm estimated by mercury porosimetry was treated with a dispersion of copper exchanged (2.5 wt % copper) chabazite zeolite ammonia SCR catalyst such that it contained 0.5 g/in$^3$ (8.2 g/cm$^3$) in the channel walls throughout the length of the filter.

Figure 5:
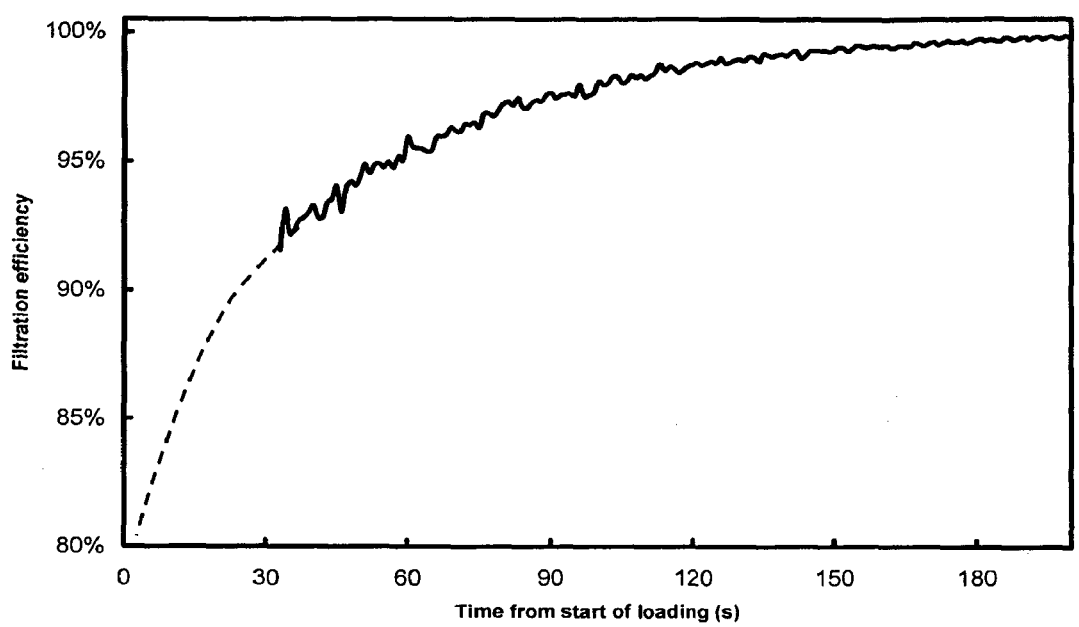
FIG. 5 is a graph showing the filtration efficiency plotted against time for a standard SCR catalysed filter (prior art)
Figure 6:
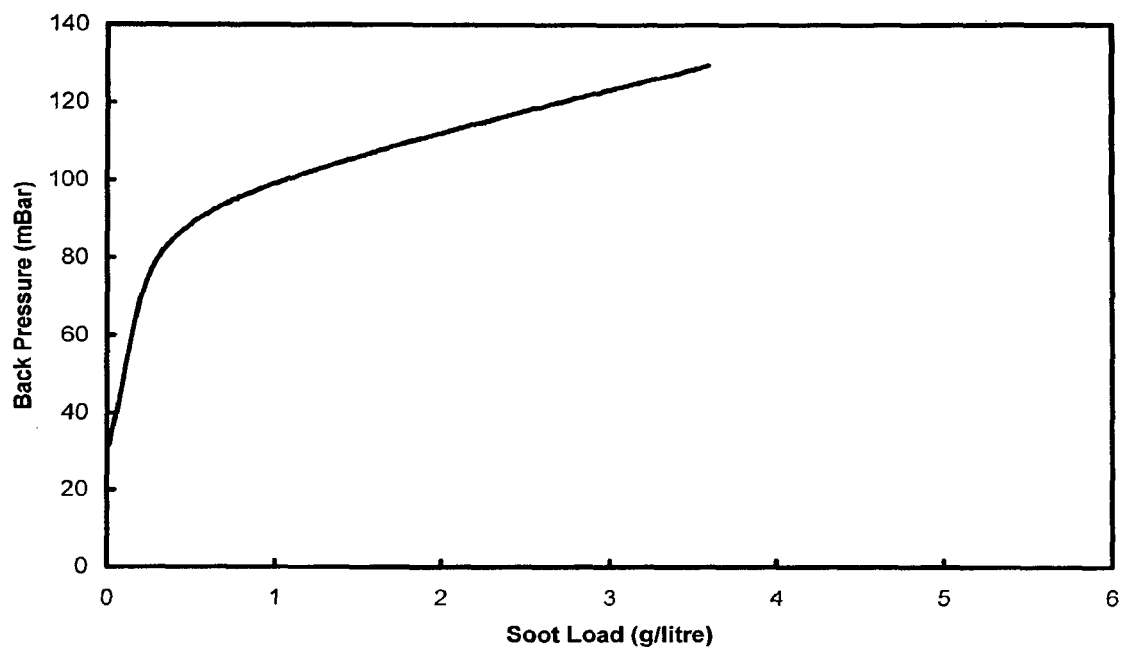
FIG. 6 is a graph showing backpressure plotted against soot loading for a standard SCR catalysed filter (prior art)

The filter was then loaded with particulate matter as in Example 1 using a DPG. The filtration efficiency and backpressure changes were monitored as previously described, and the results displayed in FIGS. 5 and 6 respectively.

Example 4

Figure 7:
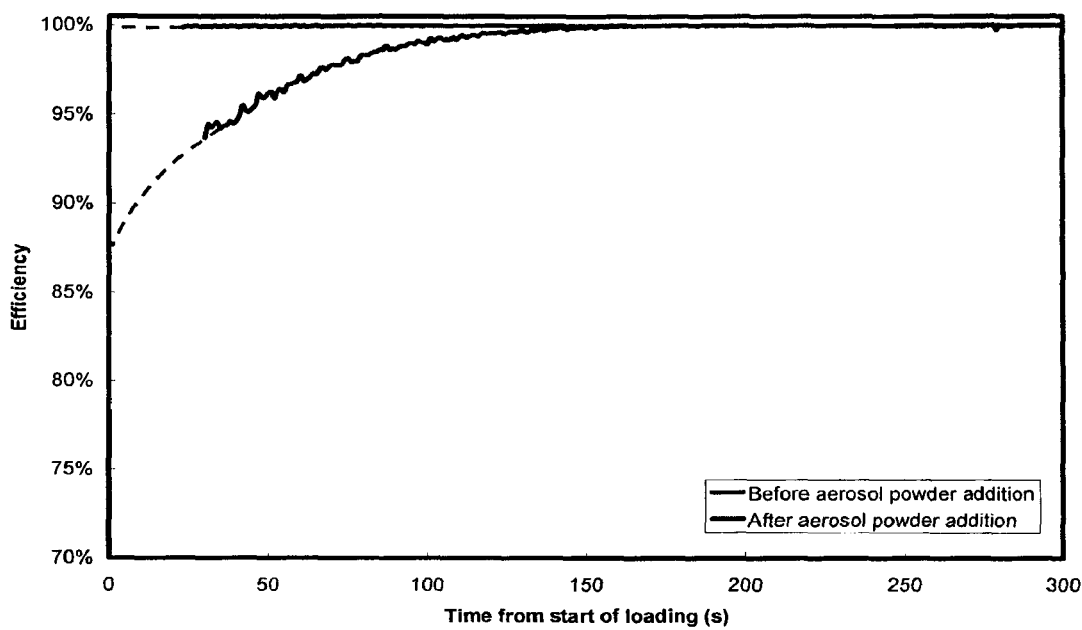
FIG. 7 is a graph comparing the filtration efficiency of the prior art SCR catalysed filter shown in FIG. 5 with the same prior art filter including dry refractory material powder on inlet surfaces according to the present invention.
Figure 8:
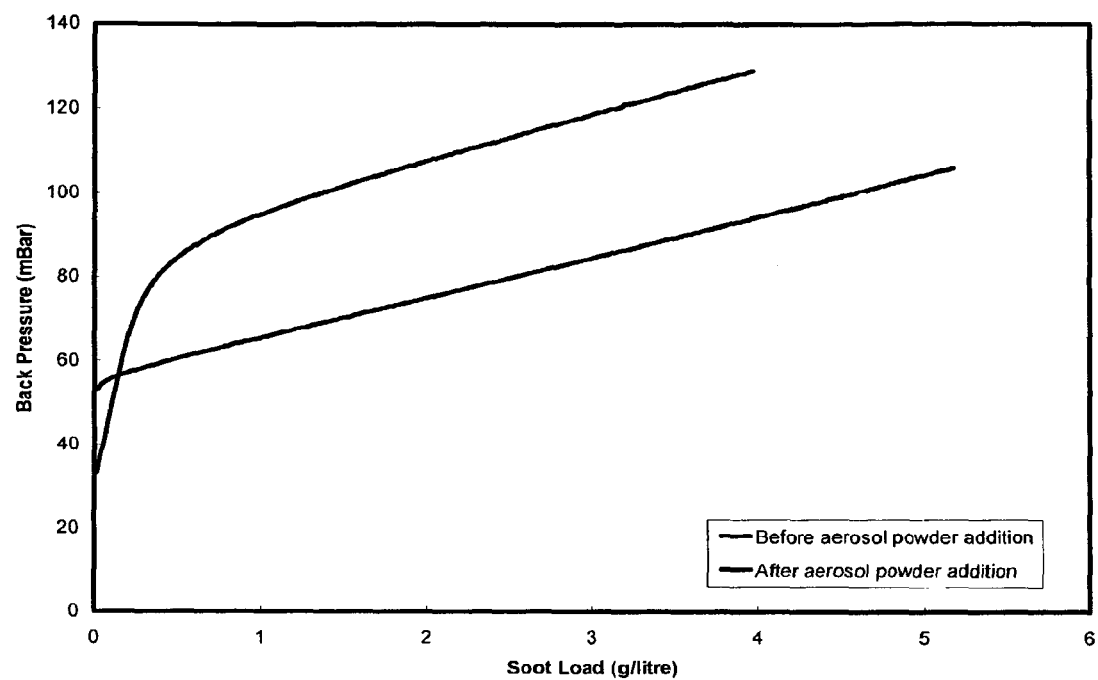
FIG. 8 is a graph comparing the soot loaded backpressure of the prior art SCR catalysed filter shown in FIG. 6 with the same prior art filter including dry refractory material powder on inlet surfaces according to the invention.

Filter Catalysed with Selective Catalytic Reduction Catalyst with Refractory Added Material The same filter that was used in Comparative Example 3 was heated in an electric furnace at 650° C. to burn off all of the particulate matter and then when cooled zeolite (11 g ZSM-5) was evenly dispersed as an aerosol over the inlet side of the filter using the same method described in Example 2. The filtration performance and backpressure during loading with particulate matter were measured as previously and the results shown in FIGS. 7 and 8 respectively.

The filter was then fitted to the exhaust gas system of a bench-mounted Euro IV compliant, 2 liter direct injection, common rail engine (suitable e.g. for a passenger car) downstream of a 1 liter oxidation catalyst (95 g/ft$^3$ with 2:1 weight ratio of platinum and palladium coated onto a 350 cell per square inch cordierite monolithic flow through substrate), with the filter orientated so that the powder treated channels were on the gas inlet side of the filter. The engine was operated using a two-step cycle as follows:

Step 1: engine speed 3000 rpm, engine load 290 Nm, duration 30 minutes, gas temperature at inlet to oxidation catalyst was 560° C., gas temperature exiting the oxidation catalyst and at inlet to filter was 545° C.

Step 2: engine speed 1800 rpm, engine load 75 Nm, with in-cylinder Diesel fuel post injection, the duration was 30 minutes, gas temperature at inlet to oxidation catalyst 490° C., and the gas temperature exiting the oxidation catalyst and inlet to the filter was 600° C.

Figure 9:
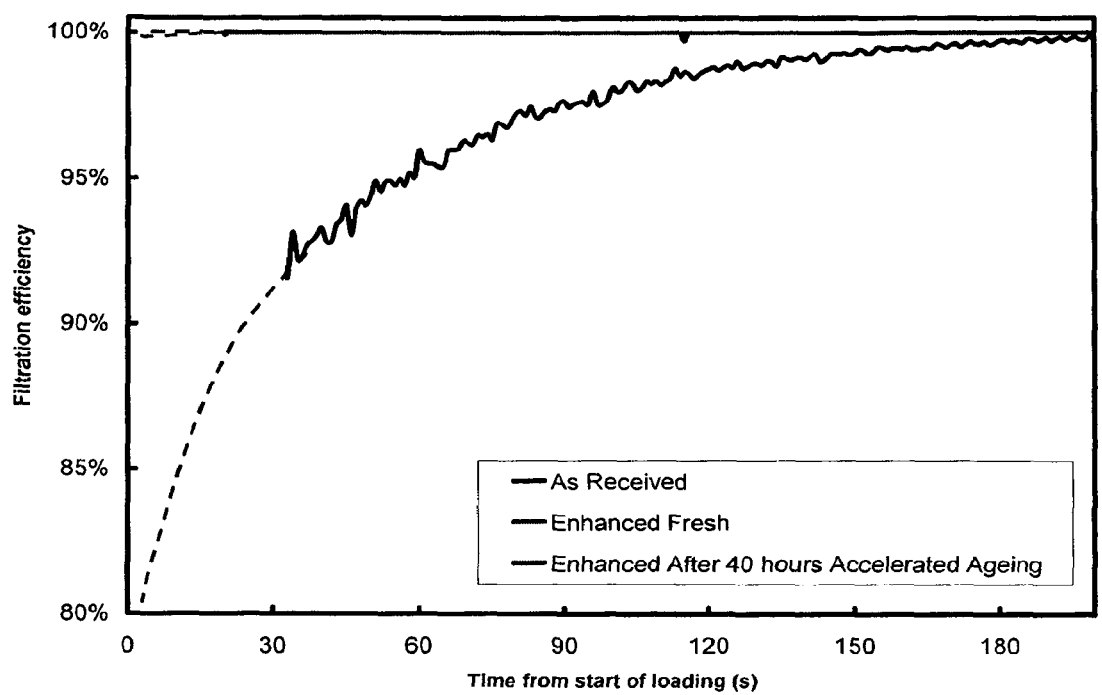
FIG. 9 is a graph comparing the filtration efficiency of the prior art SCR catalysed filter shown in FIG. 7 with the same prior art filter including dry refractory material powder on inlet surfaces according to the present invention both before and after engine ageing.
Figure 10:
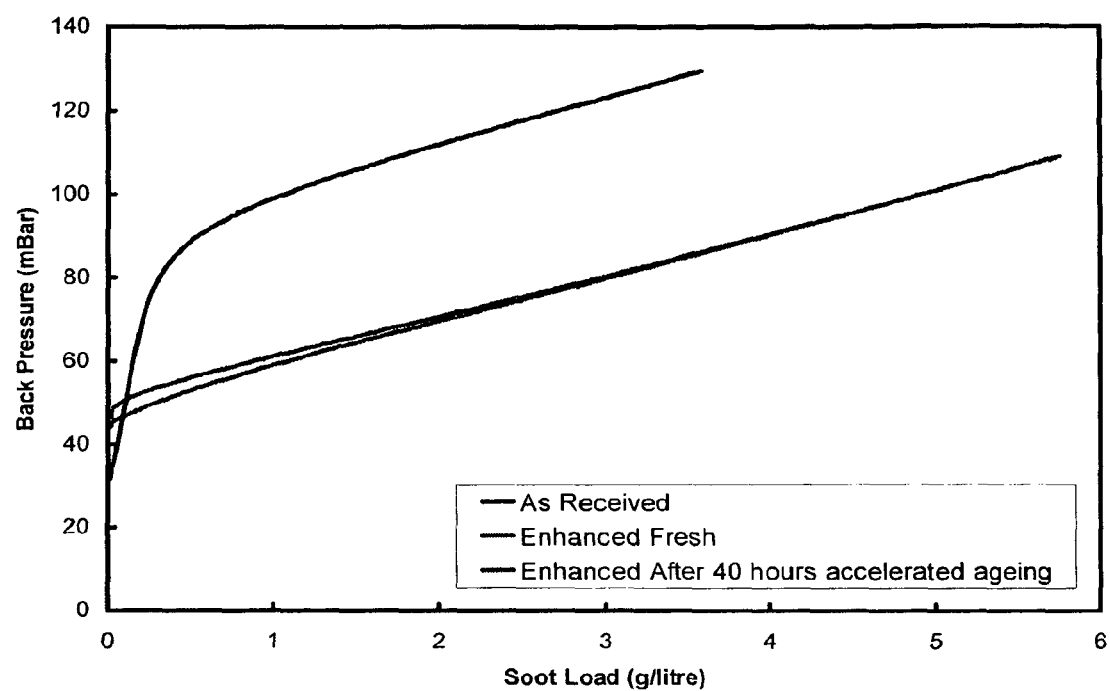
FIG. 10 is a graph comparing the soot loaded backpressure of the prior art SCR catalysed filter shown in FIG. 8 with the same prior art filter including dry refractory material powder on inlet surfaces according to the invention both before and after engine ageing.

Standard Diesel fuel was used with 50 ppm sulphur content. Steps 1 and 2 were sequentially repeated for a total of 20 hours. The filter was then removed from the exhaust system and any particulate matter removed by treatment at 650° C. in and electric furnace for 3 hours. Using a DPG the filtration efficiency and backpressure was monitored during particulate matter loading as previously described in Comparative Example 1 and the results shown in FIGS. 9 and 10 respectively.

The significant improvement in filtration efficiency and backpressure achieved by the addition of the zeolite remained even after the filter had been aged on an engine for the equivalent of some 40,000 km.

Example 5

Filter Catalysed with Selective Catalytic Reduction Catalyst—with Added Catalysed Refractory Material A filter with the same dimensions and SCR catalyst as in Comparative Example 3 was tested on the DPG and the filtration efficiency and backpressure performance was found to be similar to Comparative Example 3. The particulate matter was then completely removed by burning in an electric furnace at 650° C. and then when cooled a mixture of copper exchanged (2.5 wt % copper) chabazite zeolite (36 g) and zeolite ZSM5 (6 g) (no copper) was evenly dispersed as an aerosol over the inlet surface side of the filter using the same method described in Example 2.

Figure 11:
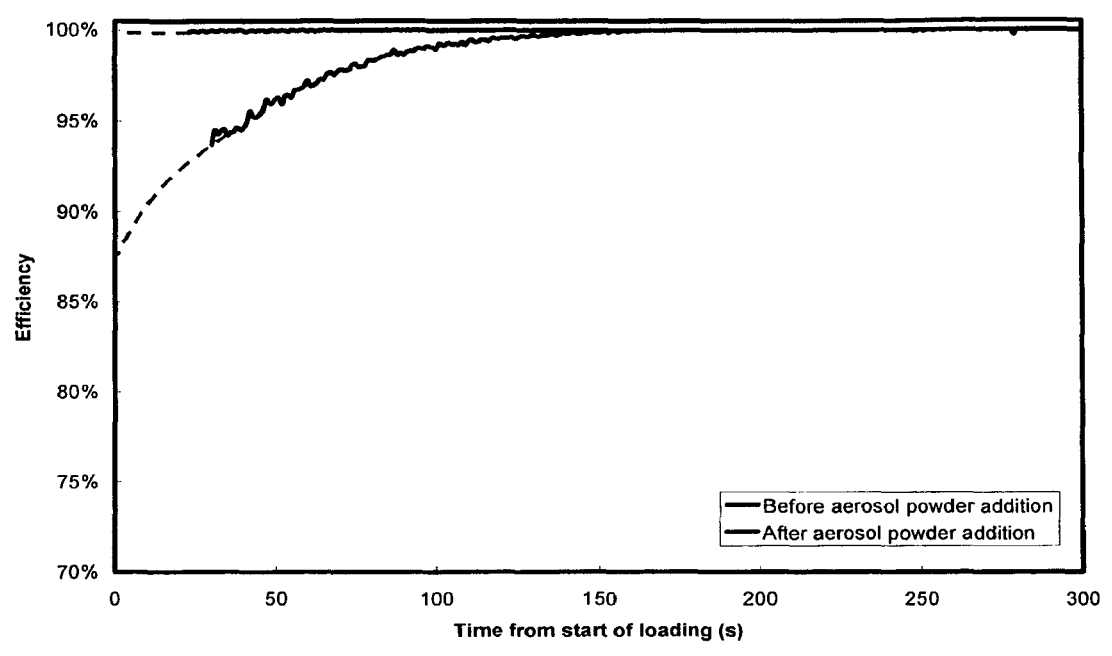
Figure 12:
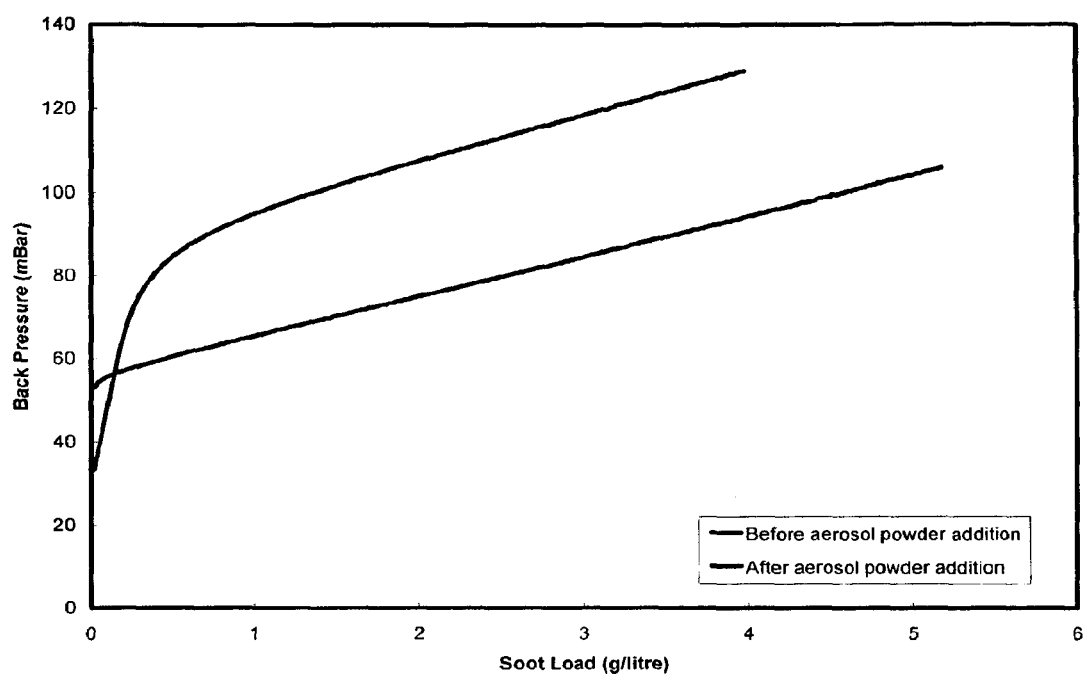
FIG. 12 is a graph comparing the soot loaded backpressure of a prior art SCR catalysed filter with the same prior art filter including catalysed dry refractory material powder on inlet surfaces according to the invention.

The filtration efficiency and backpressure performance of the filter before and after the addition of the catalysed material are shown in FIGS. 11 and 12 respectively.

Figure 13:
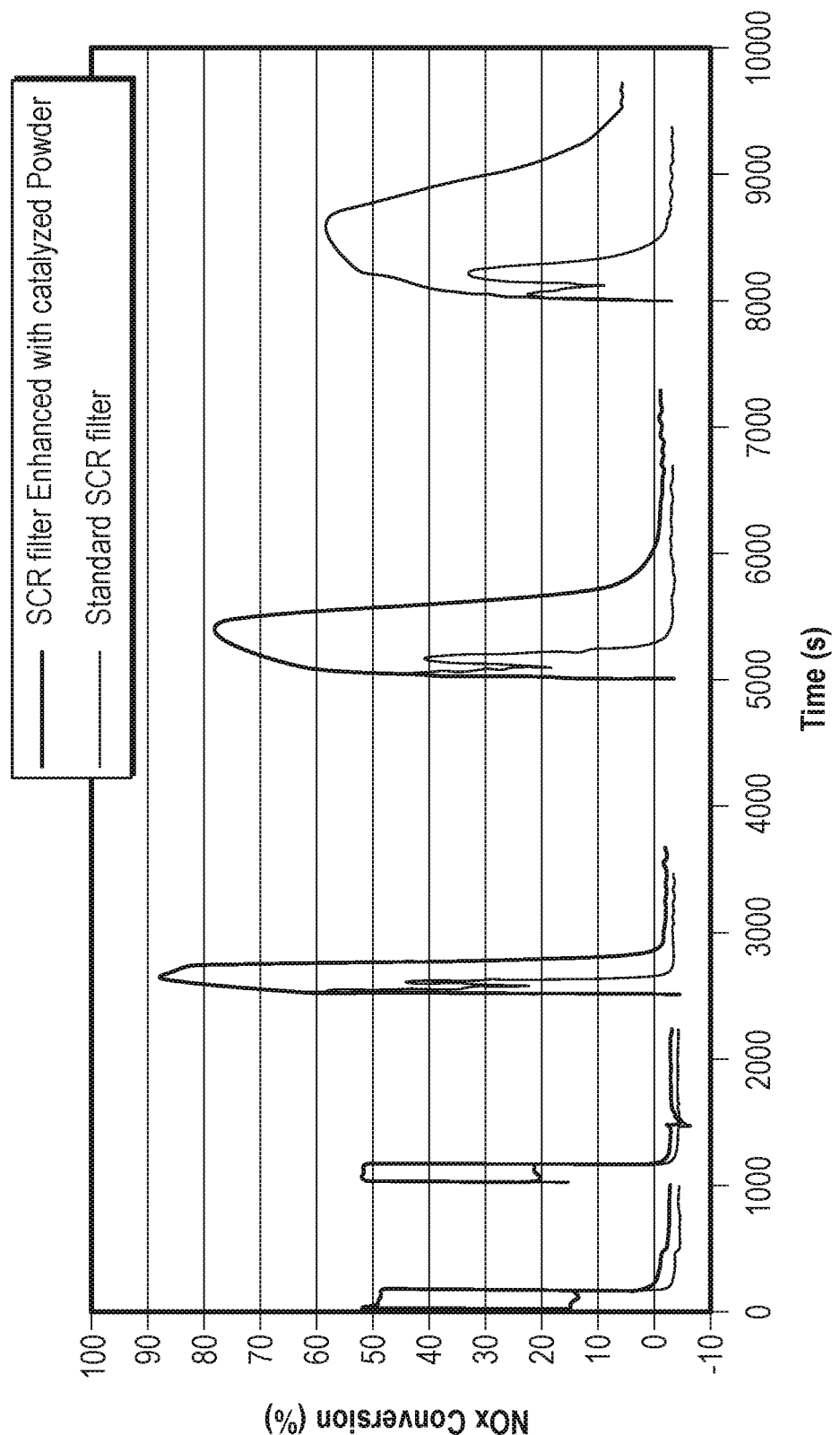
FIG. 13 is a graph comparing the NO$_x$ conversion improvement with and without addition of catalysed refractory material on a prior are SCR catalysed filter.

As well as achieving significant improvements in both filtration efficiency and backpressure the addition of catalysed material serves to increase the $NO_x$ catalytic performance of the filter and this is shown in FIG. 13. These results were obtained after lean hydrothermal ageing at 800° C. for 16 hours in 10% oxygen ($O_2$), 10% water vapour, nitrogen ($N_2$) balance and showed a marked improvement. The aged part was tested using the same engine set-up as described in Example 4 fitted with an urea injector for injecting urea solution (AdBlue) into exhaust gas between the oxidation catalyst and the filter. Diesel fuel of <10 ppm sulphur was used. Following an initial phase, the engine was run at a series of engine loads in order to achieve a desired filter inlet temperature. The test conditions were as follows. "Alpha" is defined as the $NH_3/NO_x$ ratio. The Exhaust Gas Recirculation valve position programmed into the engine control strategy of the engine was overridden in order to turn EGR off, so that steps 3-5 inclusive would be concluded in a reasonable period of time (instead of hours). The entire series of steps 1 through 5 were conducted one immediately following another.

| Step No. | Filter inlet temperature (° C.) | Urea injection strategy | Step end point |
|---|---|---|---|
| 1 | 450 | Target 0.7 Alpha (EGR on) | 2.5 minutes at set evaluation point |
| 2 | 400 | Target 0.7 Alpha (EGR on) | 2.5 minutes at set evaluation point |
| 3 | 300 | Target 1.5 Alpha (EGR off) | Detection of 20 ppm ammonia slip at filter outlet |
| 4 | 250 | Target 1.5 Alpha (EGR off) | Detection of 20 ppm ammonia slip at filter outlet |
| 5 | 220 | Target 1.5 Alpha (EGR off) | Detection of 20 ppm ammonia slip at filter outlet |

Referring to FIG. 13, the peaks from right to left represent steps 1 through 5. It can be seen that in addition to the improved filtration efficiency and backpressure performance of the filter before and after the addition of the catalysed material as shown in FIGS. 11 and 12 respectively, FIG. 13 shows a marked improvement in $NO_x$ conversion activity compared with the Comparative Example 3 filter (labelled "Standard SCR filter").

The invention claimed is:

1. A method for producing a filter comprising spraying a dry particulate aerosol onto an inlet surface of a porous filter for filtering particulate matter from a lean-burn exhaust gas, to form a filter cake having a density of 0.3 to 1.2 g/in³, wherein said aerosol comprises inorganic particles selected from the group consisting of silicate zeolite, aluminosilicate zeolite, metal-substituted aluminosilicate zeolite, non-zeolitic molecular sieve, and metal oxide, provided that said metal oxide particles have an average size of greater than 0.2 μm and less than 5 μm,
wherein the filter comprises: (a) a porous substrate having an inlet surface and an outlet surface, wherein the inlet surface and the outlet surface are separated by a porous structure; and (b) a catalytic filter cake in the form of a bridge network on the inlet surface, said bridge network comprising interconnected inorganic particles selected from the group consisting of silicate zeolite, aluminosilicate zeolite, metal-substituted aluminosilicate zeolite, non-zeolitic molecular sieve, and metal oxide, provided that said metal oxide particles have an average size of greater than 0.2 μm and less than 5 μm, where the interconnected inorganic particles are dry aerosol deposited, the particles form a bridge over the pores.

2. The method of claim 1 wherein said inorganic particles of said aerosol are derived from a powder having a bulk density of 0.1 to 0.4 g/cm³.

3. The method of claim 1 wherein said dry particulate aerosol is deposited on an untreated substrate.

4. The method according to claim 1, wherein the cake is derived from a powder having a bulk density of 0.05 to 1 g/cm³.

5. The method according to claim 1, wherein the porous substrate as a mean pore diameter of about 11-22 μm.

6. The method according to claim 1, wherein the porous substrate is a wall-flow filter.

7. The method according to claim 1, wherein the cake is present in an amount less than 1.2 g/in³.

8. The method according to claim 1, wherein the inorganic particles are a Selective Catalytic Reduction (SCR) catalyst.

9. The method according to claim 1, wherein the inorganic particles are selected from the group consisting of alumina, silica, zirconia, ceria, chromia, magnesia, calcia, titania and mixed oxides of any two or more thereof.

10. The method of according claim 1, wherein the inorganic particles are zeolite or a non-zeolite molecular sieve having a CHA framework.

11. The method according to claim 1 further comprising a catalytic washcoat selected from the group consisting of Three-Way-Catalyst (TWC), NOx absorber, oxidation catalyst, hydrocarbon trap, lean NOx catalyst, and combinations thereof.

12. The method according to claim 1, wherein the inorganic particles do not substantially enter the pores of the porous substrate.

* * * * *